United States Patent
Curtice et al.

[15] 3,646,998
[45] Mar. 7, 1972

[54] METHOD AND COMPOSITIONS FOR STABILIZING INCOMPETENT OIL-CONTAINING FORMATIONS

[72] Inventors: Beverly A. Curtice; Bobby G. Harnsberger, both of Houston, Tex.

[73] Assignee: Texaco Inc., New York, N.Y.

[22] Filed: June 8, 1970

[21] Appl. No.: 44,550

[52] U.S. Cl. .................................166/276, 106/90, 106/98, 166/294
[51] Int. Cl. ........................................C04b 7/02, E21b 43/02
[58] Field of Search ..................................166/276, 292–294; 106/90, 98

[56] References Cited

UNITED STATES PATENTS

| | | | |
|---|---|---|---|
| 3,429,373 | 2/1969 | Harnsberger et al. | 166/276 |
| 2,805,719 | 9/1957 | Anderson | 106/98 X |
| 3,145,774 | 8/1964 | Patchen | 106/98 X |
| 3,368,623 | 2/1968 | Carter et al. | 166/276 |
| 3,467,193 | 9/1969 | Messenger | 166/294 X |

*Primary Examiner*—Stephen J. Novosad
*Attorney*—Thomas H. Whaley, Carl G. Reis and James F. Young

[57] ABSTRACT

Improved method of and compositions for the treatment of an oil-containing incompetent formation to prevent the movement of unconsolidated sand particles in an underground formation by forming a treating composition of sand, cement, silica flour, and a sufficient amount of petroleum oil fraction containing an oil-wetting agent therein to oil-wet the sand, cement, and silica flour particles, suspending the resulting treating composition in an aqueous carrier medium, injecting the aqueous suspension against the unconsolidated formation at a pressure effective to force the treating composition into contact with the unconsolidated formation, contacting the placed treating composition with an aqueous surface active agent solution to water wet the cement particles, permitting the cement to set and form a permeable cement and recovering oil through the cement.

12 Claims, No Drawings

METHOD AND COMPOSITIONS FOR STABILIZING INCOMPETENT OIL-CONTAINING FORMATIONS

The present invention relates to the treatment of permeable underground formations. More particularly, the present invention relates to an improved method of treating permeable underground unconsolidated sand-containing formations and particularly oil- and/or gas-containing unconsolidated sand formations to stabilize the sandy portion thereof and to an improved treating composition useful in the stabilization of such incompetent sand containing underground formations.

The recovery of fluids such as, for example gas and/or oil from underground formations has been troublesome in areas wherein the underground formation is composed of one or more incompetent sand-containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluids toward the bore hole results in a loss of these fluids to the producer or so decreases the rate of fluid recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc., being used to recover the formation fluids to the surface with resulting damage to the moving parts thereof as the sand particles are very abrasive.

Many attempts have been made heretofore to prevent or decrease the flow of undesirable sand particles in the formation and/or in the production tubing and associated equipment, such as by the placement of sand screens, filters, liners, and so forth. These prior attempts have been unsuccessful for a number of reasons among which is that these mechanical devices fail to prevent completely the flow of the formation particles into the production equipment. In addition these devices interfere with various types of completion and workover operations. In recent years, the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized form permeable barriers in the formation to prevent the sand particles from movement therethrough. However, this technique of sand consolidation has not met with widespread acceptance because of the inherent difficulties of effecting polymerization of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods.

It is known from commonly assigned U.S. Pat. No. 3,429,373, issued Feb. 25, 1969, titled "Method and Composition for Stabilizing Incompetent Oil Containing Formations" to form a slurry of sand, cement and a sufficient amount of a petroleum oil fraction containing an oil wetting agent therein to oil wet the sand and cement particles, suspending the oil wet sand and cement particles in an aqueous carrier medium, injecting the aqueous suspension against the unconsolidated sand formation, contacting the suspension with an aqueous surface active agent solution to water wet the cement particles, permitting the cement to set and form a permeable cement and recovering oil through the cement.

By the improved method and composition of the present invention one is able to treat more effectively the underground formation to be stabilized in a rapid and efficient manner.

One object of the present invention is to provide an improved method of treating underground sand-containing formations to stabilize the incompetent formation. An additional object is to provide a fluid-permeable barrier between the formation sand and the well bore to prevent or to minimize the flow of unconsolidated sand particles therethrough while maximizing the flow of desired fluids and particularly petroleum hydrocarbons therethrough. A still further object is to provide an improved novel treating composition for use in stabilizing incompetent sand formations and to a method of placing same to form a permeable cement filter against the incompetent formation.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing against said formation a particular treating composition consisting essentially of a hydrocarbon oil wet sand, cement, oil-wetting agent and finely ground silica dispersed or suspended in an aqueous carrier medium in an amount sufficient to stabilize the formation and then to contact the introduced treating composition with an aqueous solution of a hydrophilic surfactant to penetrate the oil layer about the sand, cement and finely ground silica components of the treating composition and to effect setting of the cement to form a fluid-permeable barrier between the formation and the well bore. The resultant formed permeable cement barrier serves to prevent or to materially reduce the flow of the unconsolidated sandy particles therethrough while permitting the flow of desirable formation fluids through the permeable barrier at a substantially unimpaired rate.

In carrying out the improved method of the present invention the treating composition suspended in the aqueous carrier medium can be pumped down the well bore preferably under sufficient pressure to force the hydrocarbon oil-wetted sand-cement-oil-wetting agent finely ground silica admixture against the unconsolidated formation adjacent to or in reasonable proximity to the well bore. When the treating composition is placed against the formation to be consolidated the treating composition then is contacted with an aqueous solution of a hydrophilic surfactant which displaces the oil layer around the sand-cement-finely ground silica particles and renders these particles water wet. The cement component of the composition then sets up and hardens. After the cement hardens the well can be equipped for production and the formation fluids can be recovered by passing through the resulting formed permeable cement barrier into the well bore and recovered therefrom without the formation fluids being contaminated with the presence therein of unconsolidated sand particles.

The improved method of the present invention is particularly adaptable for use in any type of well completion but is generally used in a well wherein casing has been set and which has perforations therein at the desired intervals behind which the unconsolidated formation sands are located. Packers can be initially set above and below the perforated intervals to prevent the treating composition from passing into the nonisolated portions of the well and also to permit buildup of sufficient pressures on the treating composition to force same through the perforations and against the formation without plugging up the well bore. After the treating composition has been forced through the casing perforations and against the formation and after it has been contacted with the aqueous solution of the hydrophilic surfactant the well is closed in to permit the cement to set and form the permeable cement barrier for the unconsolidated sand in the formation.

The treating composition useful in the method of the present invention must meet certain specific requirements. The sand component in general should be closely sized in the broad range 12–80 mesh, i.e., 12–20, 20–40, 40–60, or intermediate meshes, to permit effective relatively high-permeability cement barriers being formed. In addition, the ratio of the sand component to the cement component should be about three parts to about 12 parts by weight of sand per part of cement. It has been found that a frac sand, i.e., a sand customarily used in formation-fracturing operations, having a size of between about 20 and 40 mesh is most suitable for use in the cement slurry of the present invention. It is preferred to use a graded sand with the larger grains being not more than about twice the diameter of the smaller grains, i.e., 12-20 mesh, 20-40 mesh, 40-60 mesh, etc. In general, a 20-40 mesh sand is used because of its ready availability and adaptability for use in stabilizing most formations In addition, the use of a 20-40 mesh sand appears to prevent premature bridging which is likely to be more prevalent with finer mesh sands. Sand particles which are coarser than about 12 mesh and finer than about 80 mesh are unsuitable for use in the composition of the present invention. The coarser particles are not satisfactory because the resultant set cement barrier has too great a permeability to prevent the flow of very fine unconsolidated sand particles therethrough when the well is placed on production. Very fine sand particles, that is those sand particles finer than about 80 mesh, are unsuitable because the resultant set cement has too low a permeability to permit the flow of desired formation fluids therethrough.

The cement component of the composition of the present invention should be present in the composition in a ratio of about one part of cement to from three to about twelve parts by weight of sand, on a weight basis. The cement component of the composition of the present invention may be any of the cements normally used in oil well cementing operations as well as plaster of paris cement. It is preferred that the cement component be a lightweight Portland cement having a density of about 75 pounds per cubic foot and a chemical analysis approximately as follows: silicon dioxide 38.3%, aluminum oxide 13.0%, ferric oxide 5.2%, calcium oxide 35.7%, magnesium oxide 1.6%, and sulfur trioxide 2.4%, with a loss on ignition of approximately 3.3%. This particular lightweight Portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore are not as practical for use in the cement composition of the present invention. These other cements appear to lose some of their compressive strength and become eroded from contact with sodium chloride and sodium sulfate solutions. In contrast the cements of the composition of the present invention are very resistant to erosion by sodium chloride or sodium sulfate solutions and do not lose their compressive strengths even after prolonged exposure thereto.

The finely ground silica component of the composition must be of a size sufficient to pass through the openings of a No. 200-325 sieve (U.S. Sieve Series), i.e., a sieve having openings of 0.0029-0.0017 inch. The finely ground silica component is employed in an amount of from about 0.01 part to about 0.30 part, preferably 0.02 to 0.04 part, by weight per part by weight of cement.

The hydrocarbon oil component of the composition should be employed in an amount of from about 0.3 part to about 0.7 part by weight per part by weight of cement. It is preferred that the oil component be employed in an amount of about 0.35 to about 0.45 part by weight per part by weight of cement. Use of the oil component in his amount provides sufficient oil to wet the cement and sand components of the composition and at the same time avoids an excess thereof which might damage the unconsolidated underground formation by the cement component being dispersed from the sand component when the composition is placed adjacent thereto.

Suitable hydrocarbon oils include the kerosene and diesel oil fractions of a petroleum crude oil as well as refined oil fractions, and refined motor oils.

A necessary component of the petroleum oil fraction of the composition of the present invention is an oil wetting water repellent agent, i.e., a water-insoluble oleophilic material of relatively high molecular weight which will permit the petroleum fraction to oil wet the surfaces of the sand, cement and finely ground silica particles in the treating composition. The oil-wetting agent must contain an oleophilic group and a polar group for preferential adsorption on or at the oil and sand-cement interfaces. Representative oil-wetting agents useful in the practice of the present invention include the relatively high molecular weight amines such as for example, the $C_{10}$-$C_{18}$ hydrocarbylamines, decyl-, dodecyl- and octadecyl-amine, the $C_{10}$-$C_{18}$ fatty alcohols such as cetyl and octadecyl alcohol, the $C_{10}$-$C_{18}$ alkylated phenols and naphthols, natural fatty material such as lanolin, lard, cottonseed oil and fatty acid glycerides, amides such as the $C_{12}$-$C_{18}$ fatty acid amides, and mixtures of these oil wetting agents.

The oil-wetting agent is used in an amount of from about 1 to about 10 percent by weight, based on the weight of the cement particles in the treating compositions.

It has been found that a preferred procedure is to first dissolve the oil wetting agent in a solvent such as isopropyl alcohol, before mixing with the oil component to facilitate mixing of these components.

The order of mixing the components of the treating composition is important. The sand, cement, oil, and oil-wetting agent components are first intimately mixed then the finely ground silica is added to the first admixture and further mixed. Failure to observe this procedure will result in a decrease of the average compressive strength of the formed permeable cement. It is preferred to mix the sand and cement components separately, the oil and oil wetting agents separately, then mix the two mixtures and finally to add the finely ground silica thereto and intimately admix the entire treating composition.

The aqueous carrier medium containing the suspended oil wet sand and cement solids is pumped down the well bore and into the formation to be consolidated at a rate of from about 1 to 4 barrels of the suspended solids in the carrier medium per minute. Such pumping rates have been found to give the most satisfactory results in the practice of the invention.

An aqueous surface active agent solution contacts the emplaced oil-wetted sand-cement particles to displace the oil therefrom and to initiate hardening of the cement. The surface active agent used must be a water soluble material to penetrate the oil-sand-cement interface and water wet the cement particles and remove the oil therefrom. Representative surface active agents that will perform satisfactorily in the present invention include anionic, cationic and nonionic materials such as the alkyl, aryl, or alkaryl sulfates and sulfonates, the sulfated and sulfonated alkyloxyated amides, esters or ethers, hydrocarbylamine salts, esters or ether-esters of natural fats and oils, or alkyl phenols. The surface-active agents include polyoxyethylene sorbitan-monolaurate, -monopalmitate, and -monooleate, oxyalkylated amyl phenol, alkaryl polyether alcohols and polyoxyethylene ether. A preferred surface active agent is an ethoxylated nonylphenol containing about 9.5 moles of ethylene oxide, known by the trade name "Surfonic N-95."

EXAMPLE I

A mixture of 300 grams by weight of a frac sand known by the trade name "Ottawa" having a particle size of 20-40 mesh and 67 grams of a hydraulic cement known by the trade name "Trinity Lite Wate Cement" was prepared by intimately mixing the sand and cement. There was added to the mixture with stirring 29 ml. of a commercial motor oil containing 10 percent by volume of dodecylamine. The resulting stirred mixture of oil wet solids was then mixed with 2 grams of finely ground silica flour of a size capable of passing through the openings of a NO. 325 sieve (openings 0.0017 inch). The resultant admixture then was suspended in about 500 ml. of salt water (salt concentration 10 percent by weight). The suspension of oil wet solids in the saline carrier was pumped at a pressure of 10-50 p.s.i.g. into a test cell measuring 3 inches in diameter by 6 inches in length. The cell had been previously about half filled with packed sand particles having a mesh size of 70–300. The oil wet sand-cement-finely ground silica treating composition was filtered out of the saline carrier liquid. Thereafter the sand pack was treated with 400 ml. of a water solution containing 1 percent of an ethoxylated nonylphenol having an average of 9.5 ethylene oxide groups surface active agent known by the trade name Surfonic N-95. The surface-active agent in the water displaced the oil from the sand-cement-finely ground silica particles in the pack and hydrated the cement. A hardened cement resulted after a 24-hour waiting-on cement period. The water permeability of the hardened cement was found to be about 8 darcies which was sufficient to block the flow of very fine sand particles therethrough. The average compressive strength of the cured cement was about 1,910 p.s.i. A salt water solution containing 10 percent by weight of salt was flowed through the permeable cement at a rate of 200 ml. per minute for a period of 14 weeks. Observations of the permeable cement after this period indicated no decrease in its compressive strength.

COMPARATIVE EXAMPLE A

The procedure of Example 1 above was repeated except that no finely ground silica was added to the sand, cement, oil, and oil-wetting agent mixture.

The resulting cured permeable cement of this comparative example had a compressive strength of 1,400 p.s.i. which decreased after being subjected to salt water flow-through for 2 weeks to about 480 p.s.i.

Obviously, many modifications and variations of the invention as hereinbefore set forth may be made without departing from the spirit and scope thereof, and therefore only such limitations should be imposed as are indicated in the appended claims.

We claim:

1. A method of treating an incompetent formation penetrated by a well bore to prevent the movement of unconsolidated sand particles from said incompetent formation to the well bore as formation fluids are recovered from said formation which comprises forming a first treating composition of cement, from three to 12 parts by weight of sand particles having a mesh size of from about 20 mesh to about 80 mesh, from about 0.01 to about 0.10 part by weight of an oil-wetting agent, and from 0.35 to 0.7 part by weight of a petroleum oil fraction, each per part by weight of cement, and adding to said first treating composition with mixing from about 0.02 to 0.04 part by weight per part by weight of cement of finely ground silica having a size sufficient to pass through a sieve having a sieve opening of from 0.0029 to 0.0017 inch, to form a final treating composition, suspending the resulting final treating composition in an aqueous carrier medium, placing said aqueous suspension against the unconsolidated formation, contacting the placed final treating composition with an aqueous surface-active agent solution to water-wet these cement particles, permitting the cement to set and form a permeable cement barrier between the formation and the well bore whereby formation fluids can be recovered by passage through the formed permeable cement barrier.

2. A method as claimed in claim 1 wherein the aqueous suspension of the treating composition is placed against said formation by injecting said suspension at a pressure sufficient to force the aqueous suspension against the unconsolidated formation.

3. A method as claimed in claim 1 wherein the treating composition contains from 1 to 10 percent by weight of a water-insoluble, oleophilic material of relatively high molecular weight based on the weight of the cement particles.

4. A method as claimed in claim 3 wherein said oil wetting agent is a member selected from the group consisting of a $C_{10}$–$C_{18}$ aliphatic-amine, -alcohol, -acid, -amide, -glyceride, a $C_{10}$–$C_{18}$ alkyl phenol, a $C_{10}$–$C_{18}$ alkyl naphthol, lard, lanolin, cottonseed oil and mixtures of these materials.

5. A method as claimed in claim 4 wherein said amine is dodecylamine.

6. A method as claimed in claim 3 wherein said oil wetting agent is a hydrocarbyl amine containing 12–18 carbon atoms.

7. A method as claimed in claim 1 wherein said surface active agent is an ethoxylated nonylphenol containing an average of about 9.5 ethylene oxide groups.

8. A method as claimed in claim 1 wherein the treating composition is suspended in the aqueous carrier medium in an amount of from about 1 to 5 pounds of the treating composition per gallon of the carrier medium.

9. A method as claimed in claim 1 wherein the petroleum oil fraction is a refined motor lubricating oil.

10. A method as claimed in claim 1 wherein the petroleum oil fraction is a diesel oil fraction.

11. A method as claimed in claim 1 wherein the unconsolidated formation is washed with a salt water fraction to remove at least a portion of the unconsolidated sand particles adjacent to the well bore and to form a cavity in said unconsolidated formation prior to injection of the aqueous suspension of the treating composition against said formation.

12. A treating composition suspended in an aqueous medium fraction for use in forming a permeable cement barrier in an unconsolidated sand-containing oil producing formation which comprises cement, from about 3 to about 12 parts by weight of sand particles having an average mesh size of from about 20 mesh to about 80 mesh, from 0.01 to about 0.10 part by weight of an oil wetting agent, from 0.3 to 0.7 part by weight of a petroleum oil fraction and from 0.02 to 0.04 part by weight of finely ground silica having a size sufficient to pass through a sieve having a sieve opening of 0.0029 to 0.0017 inch, each per part by weight of cement, said suspended treating composition being present in an amount of from about 1 to 5 pounds per gallon of the aqueous medium.

* * * * *